R. G. WILSON.
HAND BEAN AND CORN PLANTER.
APPLICATION FILED OCT. 4, 1918.

1,312,817.

Patented Aug. 12, 1919.

Witnesses

Inventor
R. G. Wilson
By D. Swift & Co.
Attorneys

UNITED STATES PATENT OFFICE.

ROBERT G. WILSON, OF ORNDOFF, WEST VIRGINIA.

HAND BEAN AND CORN PLANTER.

1,312,817. Specification of Letters Patent. Patented Aug. 12, 1919.

Application filed October 4, 1918. Serial No. 256,849.

*To all whom it may concern:*

Be it known that I, ROBERT G. WILSON, a citizen of the United States, residing at Orndoff, in the county of Webster, State of West Virginia, have invented a new and useful Hand Bean and Corn Planter; and I do hereby declare the following to be a full, clear, and exact description of the invention, such as will enable others skilled in the art to which it appertains to make and use the same.

This invention relates to an improved hand operated bean and corn planter, and one of the objects of the invention is to provide an improved, simple efficient and practical device of this kind, which may be manufactured for a small cost and sold at a reasonable price.

A further object of the invention is to provide a planter of this kind comprising a pair of pivoted jaws or members provided with grain receptacles, and a slide coöperating between the jaws said slide having openings, whereby, as the jaws are moved from and toward each other, a drop feed of the grain from the receptacles may be affected between the lower end of the jaws.

A further object of the invention is to provide guide means for the jaws, and expansible means between the jaws for moving them from each other.

A further object of the invention is the provision of adjustable means for controlling the amount of grain to pass through the openings of the slides.

In practical fields the details of construction may necessitate alterations, falling within the scope of what is claimed.

The invention comprises further features and combination of parts as hereinafter set forth shown in the drawings and claimed.

In the drawings:—

Figure 1:
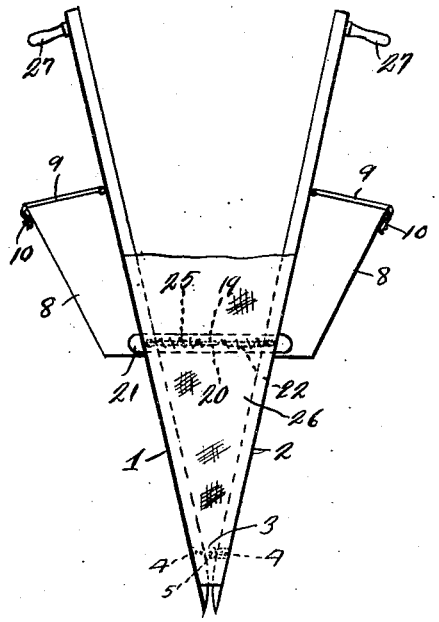
Figure 1 is a view in side elevation of the improved hand operated bean and corn planters constructed in accordance with the invention.
Figure 2:
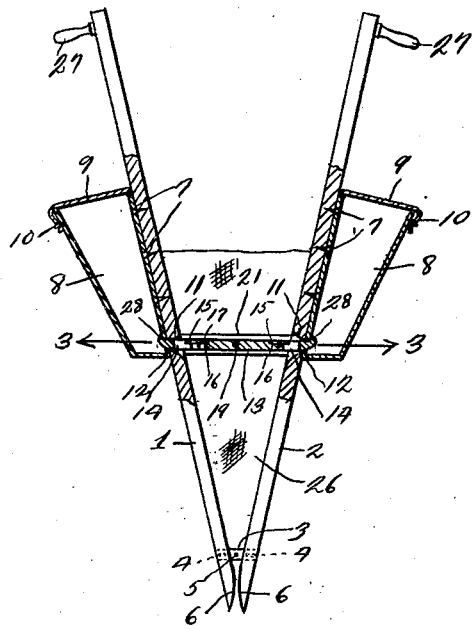
Fig. 2 is a vertical sectional view through the same.
Figure 3:
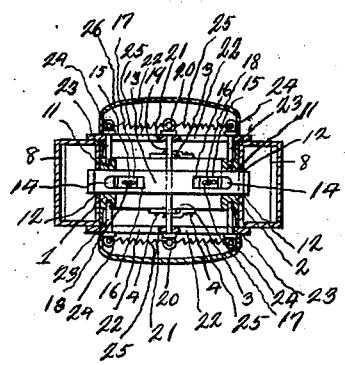
Fig. 3 is a transverse sectional view on line 3—3 of Fig. 2.

Referring more especially to the drawings, 1 and 2 designate a pair of members, to the opposite edges of which at their lower ends metallic plates or straps 3 are secured as at 4. The plates or straps of the opposite sides are pivotally united as shown at 5, whereby the jaws or members 1 and 2 are so pivotally connected, that when the members are open at their upper ends, the curved faces will become spaced sufficiently close together as to retain the grain between the members or jaws. When the members or jaws are closed at their upper portion, their lower curved faces 6 will open or separate sufficiently to permit of the discharge of the grain. Secured at 7 by means of screws or the like to the outer faces of the jaws or members are grain receptacles 8, which are provided with hinged closures 9 having latching means 10 for holding the closures in closed position. The jaws or members are provided with directly opposite openings 11 which register with the openings 12 of the inner faces of the receptacles. A drop feed slide 13 is provided, and the opposite ends of this slide engage and pass through the openings 11 and 12 respectively. The opposite ends of the slide are provided with openings 14, there being slide plates 15 mounted in guides 16 of the slide 13 for restricting or enlarging the openings 14, in order to govern the amount of grain to be fed. The slide plates 15 have elongated slots 17, for the reception of screws 18, to hold the slide plate 15 in different adjusted positions in their guides. A transverse pin 19 is carried by the slide, passing centrally transversely therethrough. The opposite ends of the pin 19 have eyes 20. Carried by the pin 19 adjacent the eyes 20 are guide plates 21, which have guide slots 22. Threaded into the opposite edges of the jaws or members 1 and 2 are pins 23 provided with eyes 24. Connecting the eyes 20 and 24 are expansion coil springs 25. The ends of these springs are fixed to the eyes 20 and 24, and the convolutions of the springs are large and stable enough to prevent said springs from bowing outwardly, in fact to hold the convolutions axially alined, as the springs are compressed and then allowed to expand, as the jaws or members are moved toward and from each other manually. It is to be noted that the guide plates 21 hold the jaws or members in registration and guide them as they are moved. Suitable canvas shields or covers 26 are secured to the opposite edges of the members or jaws 1 and 2, and overlie the coil spring 25 and the guide plates 21, and also act to close the opposite sides of the space between the jaws or members. Suitable handles 27 are carried by the upper ends of the jaws or members and the outer faces for operating the same.

It is obvious that when the jaws or members are moved toward each other, the opposite ends of the slide will enter the grain receptacles sufficiently to allow the requisite grain to enter the drop feed openings 14, and when the jaws or members are opened or spread apart by the expansion springs, the grain carried in the openings 14 will be removed from the receptacles and dropped down between the lower parts of the members or jaws 1 and 2, in order to be retained, between the curved faces 6. However, when the jaws or members 1 and 2 are again closed, the lower curved faces 6 will be allowed to separate to allow the grain to pass out into the soil, a cavity in which has been formed by the separation of the lower ends of the jaws or members 1 and 2. These operations may be repeated consecutively for each hill of corn to be planted with this improved device. The inner ends of the openings 11 are enlarged, and their lower portions are curved downwardly, to allow the grain to easily pass from the openings 14. The upper face of the slide 13 adjacent its extreme opposite ends are provided with lugs 28, to limit the separation or opening of the jaws or members 1 and 2.

The invention having been set forth what is claimed as new and useful is:—

1. In a hand operated bean and corn planter, the combination with a pair of opposing jaws, of means for pivotally uniting said jaws adjacent their lower ends whereby a space is formed between the lower ends of the jaws below the pivot uniting means, flexible covers located between and connecting the corresponding opposite side edges of the jaws, grain receptacles carried by the jaws, said receptacles and the jaws having opposing openings, a slide guided in said openings and having grain receiving openings adapted to drop feed the grain from the receptacles as the jaws are opened and closed, and means for equalizing the insertion of the opposite ends of the slides into said receptacles.

2. In a hand operated bean and corn planter, the combination with a pair of opposing jaws, of means for pivotally uniting said jaws adjacent their lower ends, whereby a space is formed between the lower ends of the jaws below the pivot uniting means, flexible covers connecting between the corresponding opposite side edges of the jaws, grain receptacles carried by the jaws, said receptacles and the jaws having opposing openings, a slide guided in said openings and having grain receiving openings adapted to drop feed the grain from the receptacles as the jaws are opened and closed, and means for equalizing the insertion of the opposite ends of the slides into said receptacles, said equalizing means comprising a pin extending transversely of the center of the slide, pins projecting from the opposite edges of the jaws and provided with eyes, guide plates carried by the first pin and having guide slots to receive the second pins and overlying said receptacles, uniformly tensioned expansive coil springs located between and connecting the first pin and said eyes, and means on the slide for engaging the inner faces of the receptacles to limit the jaws in their opening actions.

In testimony whereof I have signed my name to this specification in the presence of two subscribing witnesses.

ROBERT G. WILSON.

Witnesses:
A. L. GREGORY,
J. S. COGAN.

Copies of this patent may be obtained for five cents each, by addressing the "Commissioner of Patents, Washington, D. C."